United States Patent [19]
Miller et al.

[11] Patent Number: 5,209,875
[45] Date of Patent: May 11, 1993

[54] MULTIPLE-DOWNCOMER CONTACTING TRAY WITH ANTIPENETRATION DEVICES

[75] Inventors: Robert J. Miller, Niagara Falls; Michael R. Resetarits, Depew; Daniel R. Monkelbaan, Amherst, all of N.Y.

[73] Assignee: UOP, Des Plaines, Ill.

[21] Appl. No.: 814,541

[22] Filed: Dec. 30, 1991

[51] Int. Cl.⁵ .................................................. B01F 3/04
[52] U.S. Cl. .................................................. 261/114.1
[58] Field of Search .................................. 261/114.1

[56] References Cited

U.S. PATENT DOCUMENTS

| | | | |
|---|---|---|---|
| 2,315,481 | 3/1943 | Drewry et al. | 261/114.1 |
| 3,410,540 | 11/1968 | Bruckert | 261/113 |
| 3,417,975 | 12/1968 | Williams et al. | 261/114 |
| 4,036,918 | 7/1977 | Morgan et al. | 261/114.1 |
| 4,159,291 | 6/1979 | Bruckert et al. | 261/114 R |
| 4,381,974 | 5/1983 | Furzer | 261/114.1 |
| 4,550,000 | 10/1985 | Bentham | 261/114 R |
| 5,098,615 | 3/1992 | Resetarits | 261/114.1 |

FOREIGN PATENT DOCUMENTS

| | | | |
|---|---|---|---|
| 1416731 | 12/1975 | United Kingdom | 261/114.1 |
| 1416732 | 12/1975 | United Kingdom | 261/114.1 |

Primary Examiner—Tim Miles
Attorney, Agent, or Firm—Thomas K. McBride; John F. Spears, Jr.

[57] ABSTRACT

The efficiency of multiple downcomer type fractionation trays is improved by the provision of an individual antipenetration pan located under each set of openings in the bottom of the box-like downcomers. The pans preferably comprise perforated planar sheets and have raised lips along two opposing edges to retard significant liquid runoff along the edges parallel to the downcomer end walls. The pans are parallel to the main tray surface and located intermediate the downcomers and the upper surface of the next lower tray.

4 Claims, 3 Drawing Sheets 5,209,875

MULTIPLE-DOWNCOMER CONTACTING TRAY WITH ANTIPENETRATION DEVICES

FIELD OF THE INVENTION

The invention relates to eliminating undesired liquid penetration through fractionation trays or other devices used as vapor-liquid contacting apparatus. The invention therefore relates to apparatus used within gas scrubbing columns or fractional distillation columns to perform separations of volatile chemical compounds. The invention specifically relates to a specific type of apparatus used as fractional distillation or contacting trays and referred to in the art as multiple downcomer trays.

PRIOR ART

Vapor-liquid contacting trays are used in gas scrubbing or treating columns to remove specific contaminants such as hydrogen sulfide. Vapor-liquid contacting tray are also widely employed as fractional distillation trays. These trays are used in the hydrocarbon processing, chemical, and petrochemical industries. Accordingly, a large amount of research, development, and creative thinking has been devoted to providing improved vapor-liquid contacting trays and especially fractionation trays. Entire texts have been devoted to the subject. Fractionation tray development has therefore provided many variations in contacting area structure, downcomer design, and overall tray structure.

U.S. Pat. No. 3,410,540 issued to W. Bruckert is believed pertinent for its showing of the structure of a prior art "multiple downcomer" tray employing the highly distinctive downcomer design similar to that employed in the subject tray. This reference illustrates alternative downcomer designs and possible variations for sealing the downcomer outlet.

Most trays have circular perforations evenly distributed across the contacting surface (decking) of the tray. These allow the rising vapor to flow straight upward from the tray's surface. A smaller subset of fractional distillation trays utilize mechanical means such as small slot in the tray surface for directing the vapor in a specified direction as it passes upward through the contacting area of the tray. U.S. Pat. No. 3,417,975 to B. Williams et al. is believed pertinent for its teaching of other variations in fractionation tray design such as variations in the tray or deck active area surface material. In this reference, the deck portion of the tray comprises both circular perforations and also flow directing slots. FIGS. 1-5 of this reference illustrate tray deck materials and perforation types which ma be employed in the subject invention.

U.S. Pat. 4,159,291 issued to W. Bruckert et al is believed relevant for its disclosure of the problem of "penetrative weeping" on multiple downcomer (MD) trays and for presenting one solution to the problem. The solution proposed in this reference is to mechanically alter the outlets at the bottom of the downcomer in a manner which imparts a horizontal momentum to the descending liquid. For instance the exiting liquid is allowed to flow along an inclined slanted lip means which directs the liquid in a direction perpendicular to the downcomer.

U.S. Pat. No. 4,550,000 issued to J. B. Bentham is believed relevant for showing the provision of a perforated structure below a downcomer outlet to aid in the distribution of descending liquid across the tray deck below. This reference teaches that liquid descending from downcomers may have sufficient velocity upon impact with the next lower tray to hinder vapor flow upward through the openings in the lower tray. The roof-like structures 8 intercept the liquid and spread liquid over the tray.

BRIEF SUMMARY OF THE INVENTION

The invention is an improved multiple downcomer contacting tray, as opposed to the more widely used cross-flow tray, which provides improved efficiency due to reduced penetration of uncontacted liquid through tray surfaces and better distribution of descending liquid. Perforated antipenetration pans are located under the openings in the bottom of downcomers to reduce the downward velocity of liquid emanating from the downcomers. The pans are preferably located only below downcomer openings and have raised lips to prevent liquid from streaming off the pans into downcomers of the next lower tray.

One embodiment of the invention may accordingly be characterized as a vapor-liquid contacting tray having a generally circular circumference and comprising a perforated disk-shaped vapor-liquid contacting deck having an upper first side and a lower second side; at least two trough-shaped downcomer means each formed by two opposing sidewalls and two opposing end walls which are shorter than the side walls, with the sidewalls and end walls oriented perpendicular to the plane of the tray, each downcomer means having a substantially open inlet located on the first side of the contacting deck and a liquid sealable outlet means located on the second side of the contacting deck the outlet means comprising sets of spaced apart openings in a seal plate attached to the end walls and side walls; a plurality of antipenetration pans associated (located below) with each individual downcomer means and aligned with said openings of the outlet means in the downcomer means such that liquid descending from said openings will impinge upon an antipenetration pan, with the antipenetration pans comprising a perforated plate substantially parallel to said contacting deck.

BRIEF DESCRIPTION OF THE DRAW

PREFERRED EMBODIMENTS AND DETAILED DESCRIPTION

Figure 1:
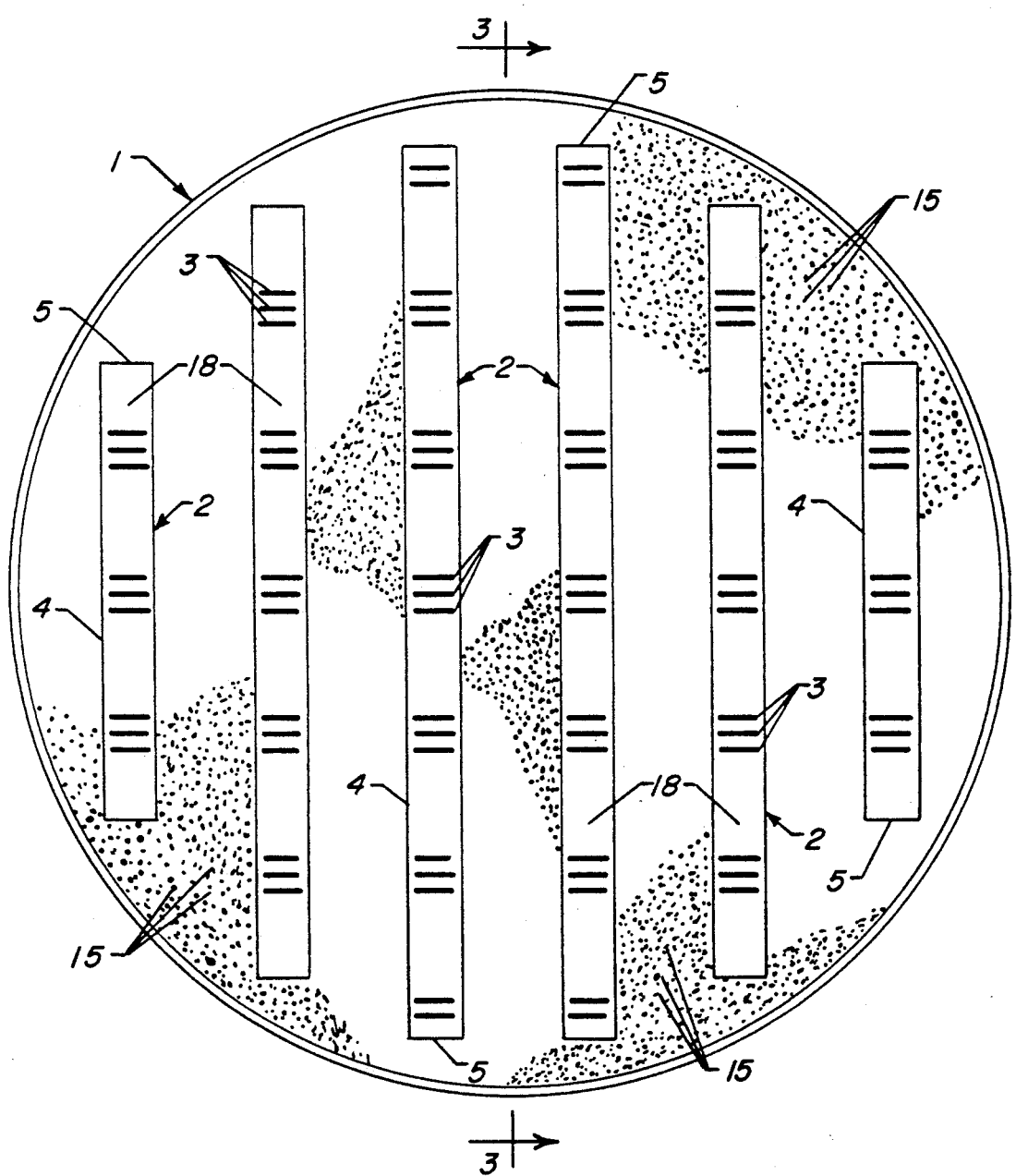
FIG. 1 is the view seen looking in what would normally be a downward direction toward the upper surface of a multiple downcomer tray located inside the outer vessel of a fractionation column. Six parallel downcomers 2 bisect the surface of the tray.

Vapor-liquid contacting devices are used in a wide variety of applications for bringing into contact a liquid, flowing through the overall device in a generally downward direction, with a rising vapor stream. For instance, such devices are widely used to contact a gas stream with a treating liquid which selectively recovers a desired compound or removes an impurity from the gas stream. The subject apparatus can therefore be used in an acid gas absorber or stripper or in an ethylene oxide absorber. Another application of vapor-liquid contacting apparatus is in the separation of chemical compounds via fractional distillation. The apparatus of the subject invention can therefore be used in a variety of vapor-liquid contacting roles. The discussion herein is primarily in terms of use for fractional distillation, but this is not intended to in any way restrict the invention to that mode of operation.

The subject apparatus can be used in the separation of essentially any chemical compound amenable to separation or purification by fractional distillation. Fractionation trays are widely used in the separation of specific hydrocarbons such as propane and propylene or benzene and toluene or in the separation of various hydrocarbon fractions such as LPG (liquified petroleum gas), naphtha or kerosene. The chemical compounds separated with the subject apparatus are not limited to hydrocarbons but may include any compound having sufficient volatility and temperature stability to be separated by fractional distillation. Examples of these compounds are acetic acid, water, acetone, acetylene, styrene acrylonitrile, butadiene, cresol, xylene, chlorobenzenes, ethylene, ethane, xylenols, vinyl acetate, phenol, butane, butylenes, hexanes, halogenated hydrocarbons, aldehydes and alcohols.

As mentioned in the above cited patent to W. Bruckert it has been noted that multiple downcomer (MD) trays can suffer from a phenomenon referred to as penetrative weeping. This occurs when liquid issuing from a downcomer hits the active (perforated) tray deck with momentum high enough to overcome the force of vapor attempting to flow upward through these same perforations in the deck. This has several undesirable consequences. A portion of the liquid may be forced through the deck perforations. This liquid bypasses much of the contacting action desired upon the tray surface, thereby reducing the efficiency of the tray. Second, if the impact of the liquid upon the surface of the deck prevents the upward flow of vapor, then the number of active perforations is decreased and effected portion of the deck is removed from being an active tray area. This can also reduce the mass transfer capability of the tray. It is an objective of the subject invention to reduce or eliminate penetrative weeping on a multiple downcomer tray. It is a specific objective of the subject invention to provide a multiple downcomer tray having a higher efficiency at high liquid loadings. These objectives are achieved by the subject invention, which may be characterized as a multiple downcomer fractional distillation tray comprising: a perforated tray deck having a planar upper first surface and a lower second surface; a plurality of downcomer means spaced in parallel arrangement across the tray deck, each downcomer means having an inlet located on the first side of the tray deck and a plurality of liquid-sealable outlets located on the second side of the tray deck; at least one individual antipenetration device aligned with and located a discrete distance away from each liquid-sealable outlet of said downcomer means and located on the second side of the tray deck, the antipenetration devices comprising a perforated substantially planar surface parallel to the tray deck.

Before proceeding further with a description of the invention, it is useful to define and characterize the type of trade referred to herein as a multiple downcomer tray. A multiple downcomer tray is distinguished from the conventional crossflow tray by several structural characteristics. First, a multiple downcomer tray does not have a "receiving pan". This is the normally imperforated section located below an inlet downcomer opening. Reference is made to U.S. Pat. No. 4,499,035 to R. D. Kirkpatrick et al. which illustrates a receiving pan. This is the imperforate space upon which the liquid descending through the inlet downcomer impacts before passing onto the active decking of the tray. Often the receiving pan is separated from the decking Or "active" area of the tray by an inlet weir. Receiving pans are therefore normally located directly below the downcomer leading from the next above conventional cross-flow fractionation tray.

Multiple downcomer fractionation trays do not have receiving pans. That is, the horizontal surface area of a multiple downcomer fractionation tray is basically divided into only downcomer means and vapor-liquid contacting area normally referred to as the deck or decking portion of the tray. There are no imperforate areas allocated to receiving descending liquid from the tray located immediately above.

Another distinguishing feature of multiple downcomer fractionation trays is the provision of a relatively large number of parallel trough-like downcomer means across the tray. These downcomer means are spaced relatively close together compared to the downcomers of most customary crossflow fractionation trays. The distance between adjacent downcomers of the same tray will normally be less than one meter and will often be less than 0.5 meter. This results in the multiple downcomer tray having a unique design when viewed from above consisting of the alternating decking areas and downcomer means evenly spaced across the upper surface of the fractionation tray, as for instance shown in FIG. 1.

The downcomer means of a multiple downcomer tray are also unique compared to the downcomers employed upon normal cross-flow fractionation trays. The downcomer means do not extend downward to the next fractionation tray. Rather they stop at an intermediate distance located between the two trays. The downcomer descending from the tray above therefore stops well above the top or inlet to the downcomers of the tray below. The top or inlet to the downcomer of a tray often functions as the outlet weir of the tray. Therefore the bottom of the downcomer o the next above multiple downcomer is well above the outlet weir of the tray located below.

Figure 2:
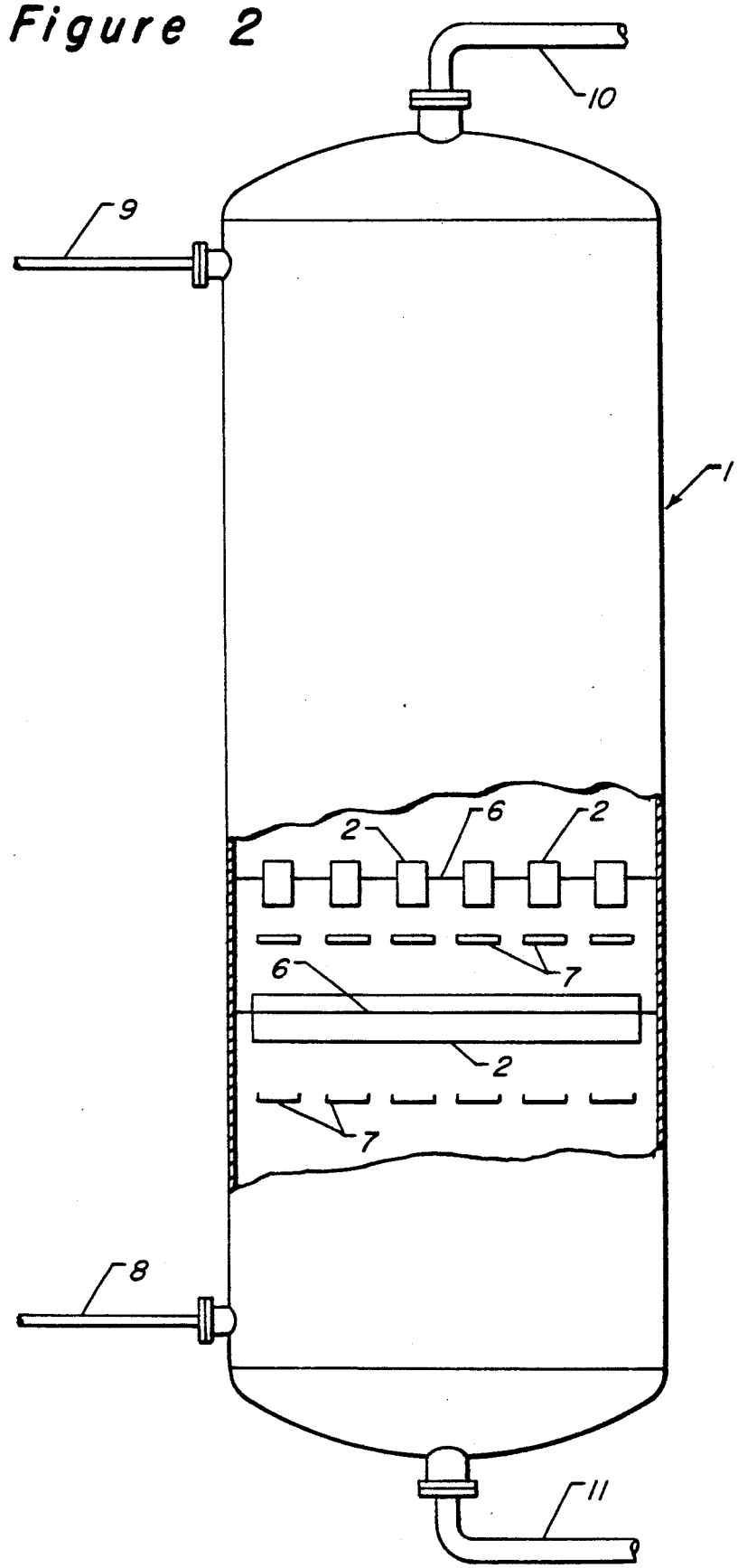
FIG. 2 is a partial cross-sectional view through a fractional distillation vessel showing the placement of antipenetration pans 7 beneath two trays having the structure shown in FIG. 1.

When installed in a column, downcomers on a particular multiple downcomer tray are normally oriented at a 90 degree angle from the downcomers of the trays located immediately above and below. The downcomers on vertically adjacent multiple downcomer trays are therefore perpendicular rather than parallel. This is shown in FIG. 2.

Yet another distinguishing feature of multiple downcomer fractionation trays is the provision of a liquid sealable outlet means in the bottom or outlet of the downcomer means. The bottom of the downcomer means is therefore partially closed off by a plate having grouped perforations or by some other means intended to retard the direct upward flow of vapor through the downcomer means as well as to allow liquid to exit the downcomer only at separate points along its length. Reference is made to the detailed description of the Drawing and the cited references for further information on this. This liquid sealable outlet is located well above the deck of the tray located immediately below and is at a point above the inlet of the downcomers associated with this next lower tray. The descending liquid is collected in the lower portion of the downcomer means and spills forth upon the next lower tray through these openings.

There is no inlet weir at the bottom of the downcomer of the subject trays as in a cross-flow tray. The liquid sealable outlet performs this function. Variations in downcomer outlet design are shown in the previously cited U.S. Pat. No. 3,410,540 issued to W. Bruckert, which is incorporated herein in its entirety for guidance in tray design and construction.

Multiple downcomer means are characterized by a very short liquid path between the point at which the liquid first enters the tray and the point at which the liquid exits the tray via the downcomer means. This is due primarily to the close spacing of the downcomers as described above. This short distance coupled with the agitation attendant with the passage of vapor upward through the decking portion of the tray results in multiple downcomer trays having essentially no liquid gradient from the liquid inlet to exit points.

The long outlet weir of multiple downcomer trays results in low froth heights. These low froth heights allow these trays to operate at lower pressure drops than conventional trays. Since the multiple downcomer tray pressure drop is less, the downcomer height required to provide an acceptable downcomer safety margin is less. The multiple downcomer trays can operate at very close tray spacings. Tray spacings of 300–400 millimeters are typical for multiple downcomer trays.

The reduced tray spacing provides some advantages. For a revamp, more trays can be placed in a given section (e.g., a 3-for-2 revamp where every two existing trays are replaced by three new trays). This can generate more theoretical trays and hence provide a better separation. For a new (or grass roots) column, lower tray spacings decrease the column's height. This could aid in the transportation and erection of the column. Also, since multiple downcomer trays are capable of handling higher loadings than conventional trays, they can be used to provide more flow through a given diameter in a revamp situation or reduce the column diameter in a grass roots application.

The physical size of any portion of a multiple downcomer tray must be chosen by a skilled designer considering all aspects of the intended operation of the tray. The following are measurement ranges of commercially employed multiple downcomer trays which are presented for the dual purposes of providing guidance in the design and use of the subject apparatus and for distinguishing the multiple downcomer trays of the subject invention from conventional cross-flow fractionation trays. The spacing between vertically adjacent trays would normally be between 20 and 91 centimeters (8–36 inches) and is preferably between 25–61 centimeters (10–24 inches).

The total open area of the deck is generally in the range of about 5 to about 15 percent of the deck area. This includes the open area provided by both circular openings and any elongated slots on the deck area of the tray. The normal hole diameter of the circular perforations may range from about 0.3 to about 2.6 centimeters ($\frac{1}{8}$–1.0 inches). A hole size of about 0.47 to about 0.64 centimeters (3/16–$\frac{1}{4}$ inch) is normally preferred. If slots are employed, the open area provided by slots is preferably from about 0.25 to about 5 percent of the area of the deck. A representative thickness of the decking is about 0.19 centimeters (0.075 inches) to 0.34 cm. The inlet openings of the downcomers are normally about 6 to about 25 cm wide (2.5–10 inches). The height of a downcomer as measured from the horizontal top edge of the outlet weir to the bottom of the liquid sealable means is normally between about 15.2 to about 45.7 centimeters (6–18 inches). This includes the height that the downcomer extends above the decking and below the decking. Any fluid flow control baffle located above the downcomer mouth would normally be at least 7.5 centimeters tall and may be up to 35.6 centimeters in height (3–14 inches) and will normally be approximately equal in length to the associated downcomer means. Again, further information on the arrangement and variations of the elements of a multiple downcomer tray may be obtained by reference to U.S. Pat. No. 3,410,540.

It is preferred that a fluid control or "anti-jump" baffle be placed over the inlet of the downcomer means in order to prevent the passage of liquid across the inlet to the downcomer. It is the function of the fluid control baffle to intercept both liquid and vapor passing horizontally over the downcomer inlet and to direct liquid into the downcomer. Basically the anti-jump baffle absorbs the horizontal momentum of the fluid which may otherwise carry it over the downcomer and allows the liquid to fall by the action of gravity into the downcomer inlet.

A more complete understanding of the subject invention may be obtained by reference to the drawings. FIG. 1 shows the view seen looking downward toward the upper surface of a multiple downcomer tray constructed according to the subject invention. The novel features of the invention are, however, hidden in this view. The particular tray represented in this drawing has six parallel downcomers 2 evenly spaced across a perforated deck and a cylindrical outer edge which abuts the inner wall of the fractionation column. Each downcomer means is comprised of two downcomer end walls 5 and two parallel sidewalls 4. The deck 6 may be composed of any form of suitable vapor-liquid contacting tray material such as normally employed on fractionation or vapor-liquid contacting trays. The deck may consist of a flat sheet of metal having relatively uniformly spaced circular perforations. Alternatively, the deck may have perforations in some other shape such as elongated slots or openings formed by raising a portion of the tray material on one side of a slit formed in the tray material such that the opening of the slot has a covering portion formed from the raised and bent tray material. This type of opening is often referred to as a vapor-directing or flow-directing device or slot since the upward traveling gases will exit the opening traveling at an angle to vertical. It is preferred that deck of the subject apparatus has such flow directing slots and that the slots have their openings directed toward the nearest downcomer. It is highly preferred that the deck contain both circular perforations and flow directing slots.

As another alternative structure for the deck, the tray material described in U.S. Pat. No. 4,328,177 may be used. This comprises narrow tapered rods which are welded to perpendicular connecting support members.

Referring once again to the Drawing, there is shown the view when looking downward towards the upper surface of a multiple downcomer fractionation tray enclosed within the outer vessel of the fractionation column 1. The outer vessel is an elongated cylindrical vessel having an inner surface close to the outer edge of the fractionation tray to allow formation of a substantially liquid tight seal. The seal may be formed in part by a support ring attached to the vessel wall. The predominating features of a multiple downcomer tray when viewed from above are the flat decking material 6 which forms the majority of the surface of the tray and a plurality, in this case 6, downcomer means 2. The downcomer means are characteristic of a multiple downcomer tray in that several downcomer means are employed in parallel relationship and extend across the surface of the tray at evenly spaced distances. Preferably but not necessarily the downcomer walls extend upward above the surface of the fractionation tray, as represented by the decking 6, and also extend a greater distance below the surface of the tray. The downcomer means therefore pass through the decking 6 as may be better seen by reference to FIGS. 2 and 3. The upper end of each downcomer means is preferably open for the entrance of froth or liquid. The bottom end of each downcomer means is closed by a plate 18 essentially parallel to the deck 6. The plate 18 will have groups of openings 3 spaced along its length. The openings are grouped together at locations chosen such that liquid descending through the openings does not fall into the downcomers of the next lower tray in the column.

FIG. 2 illustrates the placement of two fractionation trays of the subject invention within a fractionation column 1. When in use feed hydrocarbons enter this column at an appropriate point such as through inlet line 9 at the upper first end of the column. A liquid phase stream is removed from the lowermost end of the column through line 11 and vapor or mixed-phase heated fluid is passed into a lower portion of the column through inlet line 8 to supply heat and "reboil" the column. An overhead vapor stream is removed from the column through outlet line 10 and passed to the appropriate condensation and vapor-liquid separation facilities. Product streams may be recovered from the streams carried by lines 11 and 10.

The view shown in FIG. 2 illustrates two vertically adjacent trays in detail. On the upper tray an endwise view of a downcomer means 2 is provided while in the immediately lower tray a sideview of a downcomer means 2 is provided. Immediately below the downcomer means of each fractionation tray there is provided a plurality of antipenetration pans 7. This view illustrates that the orientation of the pans changes along with the orientation of the downcomer means on vertically alternating fractionation trays. Below the lower tray the vertical lips of the antipenetration pans may be discerned. Below the upper tray, the view is toward the plane of the raised lips on the sides of pans 7. The pans may be essentially square and relatively short in length, as illustrated. The imperforate lips on the pans prevent liquid from flowing off the edge of the pan into the inlet of a downcomer means located below.

Figure 3:
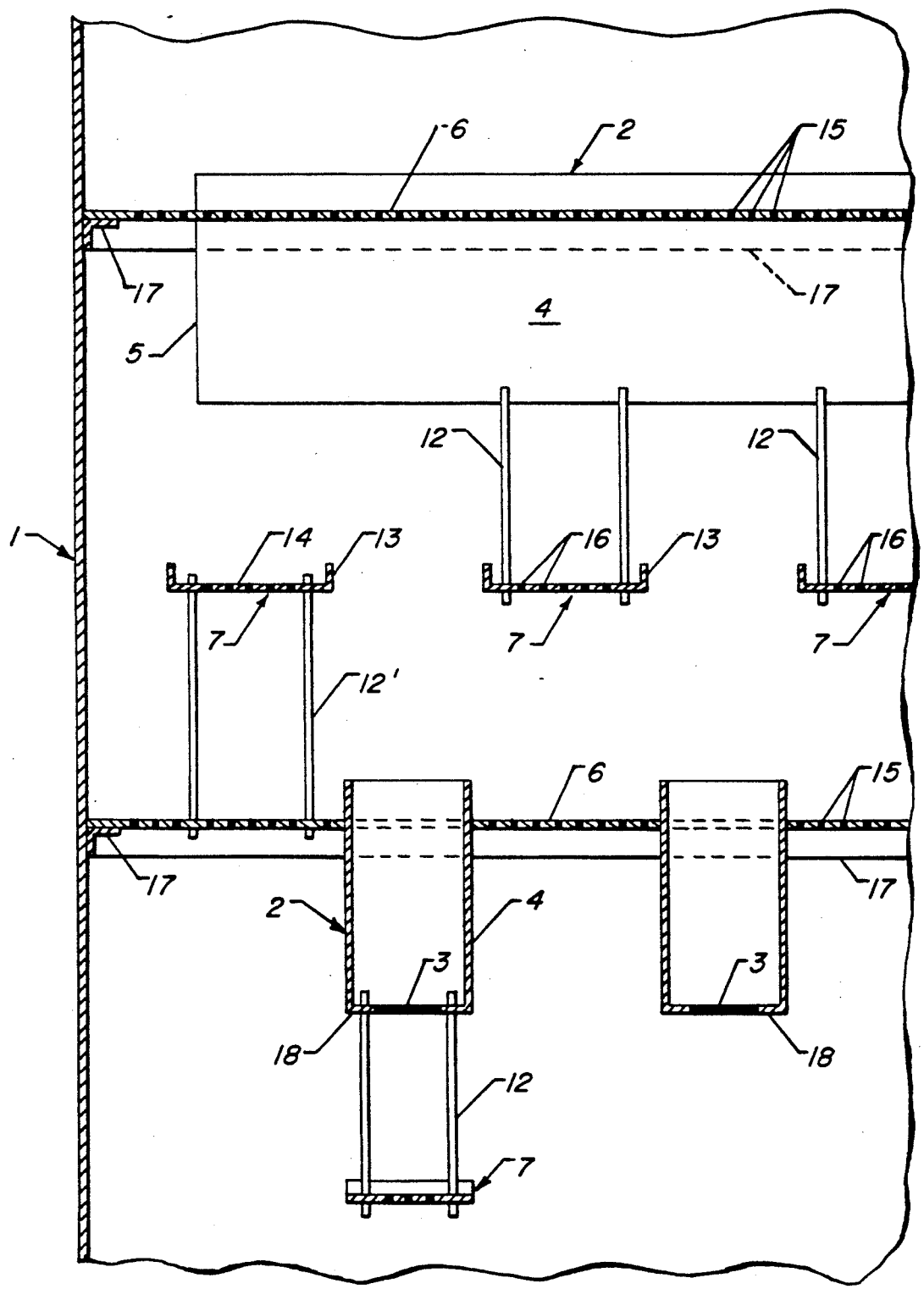
FIG. 3 is a vertical cross-sectional view of a portion of the fractionation column showing details of the structure of the trays including the downcomers 2 and antipenetration pans 7.

FIG. 3 illustrates how an L-shaped ring 17 attached to the inner surface of the outer vessel of the column 1 is used to support the fractionation trays. This bracket is a circular bracket or ring which extends around the entire periphery of each fractionation tray. The end wall 5 of the downcomer means 2 is located a small distance away from the inner surface of the outer vessel such that the strength or stiffness of the decking material 6 is sufficient to support the fractionation trays. The downcomers 2 act as beams or support members which traverse the diameter of the fractionation trays to provide the required stiffness to support the weight of the fractionation tray and the liquid suspended upon it. The structure of the multiple downcomer means of the invention therefore requires no additional major structural items beyond that shown in FIG. 3.

FIG. 3 also illustrates the provision of perforations 15 across the entire surface of the decking material 6. This is the normal configuration of the decking material upon a multiple downcomer tray and illustrates one of the characteristics of a multiple downcomer tray, which is the absence of an imperforate area of tray surface which acts as a receiving pan for liquid from the tray immediately above. The upper of the two fractionation trays shown in FIG. 3 has a antipenetration pan 7 suspended from a lower portion of the downcomer. The support arms 12 extend from the lower portion of the downcomer to the antipenetration pan. A plurality of such support arms, preferably four, are employed to hold each pan 7 in its proper position and orientation. The number, shape and configuration of the support arms 12 is subject to an extensive amount of variation and does not form an integral part of the invention. Any means of supporting and positioning the antipenetration pans may be employed. Therefore, it is contemplated that three or five support arms could be used. It is also contemplated that the support arms could be at an angle rather than vertical as shown in the Drawing.

An alternative method of supporting the antipenetration pan 7 not shown in the Drawing would employ horizontal support bars attached to the outer vessel 1 and extending horizontally across the internal volume of the fractionation column. With these brackets aligned with the downcomer means, it would be possible for each set of brackets to support all of the antipenetration pans associated with a single downcomer means. It is, however, highly preferred that the antipenetration pans are supported from the lower surface of the associated downcomer. A preferred form of such a support is a cylindrical rod having threaded portions at each end which allow it to be fastened to the downcomer and the antipenetration pan by a nut or similar fastener.

The antipenetration pan 7 itself preferably comprises a substantially planar surface 14 having a number of perforations 16. The number, size and distribution of the perforations 16 is such as to allow the liquid which falls upon the antipenetration pan 7 to both flow through the perforations 16 to the surface of the tray immediately below as well as to allow liquid to overflow the ends of the receiving pan. This allows liquid and vapor contacting to take place both underneath and around the antipenetration device. The area of the antipenetration pan need only be sufficient to intercept the liquid descending from the openings in the downcomer means immediately above. As shown in the Drawing the antipenetration pans are preferably slightly wider than the opening of the inlet of the downcomers as measured by the width of the sidewall 5. The antipenetration pans can, however, be narrower than the sidewall 5. The antipenetration pans are preferably essentially square or rectangular in form with the longest dimension of the rectangle being along the side of the antipenetration pan having the raised lips 13.

An antipenetration pan is shown supported from the lower fractionation tray through the use of support arms 12' which extend upward from the deck surface 6. These support arms 12' could be threaded rods as used to suspend the other antipenetration pans or they could be angle iron brackets of various configurations. The ends of the support rods 12 and 12' are shown extending through the antipenetration pan and the bottom of the downcomer or decking surface to allow attachment. However, the support rods could be fastened in other means as by welding.

The primary function of the antipenetration pans is to prevent the relatively large stream of liquid exiting through the opening 3 in the bottom 18 of the downcomer means 2 from impinging directly upon the perforations 15 of the decking material 6. Such impingement can lead to liquid passing directly through the deck material 6 without contacting adequate amounts of vapor to allow equilibrium to be reached between the components of the liquid stream and the vapor. In essence therefore the function of the antipenetration pans is to prevent the liquid exiting a downcomer from bypassing contact on the immediately lower fractionation tray. As referred to above a further function of the antipenetration device is to keep all of the tray deck active by preventing descending liquid from sealing the perforations in the deck.

The antipenetration pans are also preferably designed to prevent liquid from flowing directly into inlets of the downcomer means of the tray below. Therefore, the liquid is forced to be distributed across a broader section of the deck 6 of the lower tray. It is distributed over a wider area and because the liquid momentum is reduced by the antipenetration pan the liquid descending from the downcomer will have a lower tendency to penetrate the openings in the deck material. FIG. 3 intentionally shows two different methods of retaining the antipenetration pans in position. It is preferred that only one such a method is employed.

The openings in the bottom of the downcomers are positioned to pour out liquid between the downcomers below. The antipenetration pans intercept this liquid. The lips or panels provided on two sides of each antipenetration pan are to prevent liquid flowing directly off the edge of a pan into the inlet of the downcomer below. The plates are along the two sides of the antipenetration pan which are parallel to the end walls of the downcomer above and to the sidewalls of the downcomer below. The liquid therefore is forced to flow off the ends of the pan rather than the sides although some liquid passes downward through the pan at a reduced velocity. These lips are preferably imperforate and perpendicular to the planar surface of the pan but could also function if inclined at a variety of angles. The upper edge of each lip should be removed from the level of this planar surface by a distance equal to between 8 and 17 percent of the width of the pan. The "width" of the pan is intended to refer to the length of the planar surface between the lips.

One embodiment of the subject invention may accordingly be characterized as a tray useful in the fractional distillation of chemical compounds, comprising a multiple downcomer fractional distillation tray comprising: a perforated tray deck having an upper first side and a lower second side; a plurality of rectangular downcomer means spaced in parallel arrangement across the tray deck, each downcomer means having an open first end located on the first side of the tray deck and a closed second end containing a plurality of liquid-sealable outlets and located on the second side of the tray deck, with the liquid-sealable outlets being spaced along the second end of the downcomer in groupings which provide alternating imperforate and perforate zones; at least one antipenetration device aligned with and located a discreet distance away from each grouping of the liquid-sealable outlets of said downcomer means and located on the second side of the tray deck, with each antipenetration device comprising a perforated substantially planar surface parallel to the tray deck and having two imperforate side panels extending from opposing ends of said planar surface toward the liquid-sealable outlets of said downcomer means.

A more inclusive embodiment of the invention comprises a vapor-liquid contacting apparatus comprising an enclosed cylindrical outer vessel having a plurality of the subject trays mounted therein, with the vertically adjacent trays (and therefore downcomers) being perpendicular to each other. The overall apparatus would include the customary accessories for feeding the liquid and vapor streams to be contacted such as a reboiler and reflux system.

What is claimed is:

1. A vapor-liquid contacting tray having a generally circular circumference and comprising:
   (a) a perforated disk-shaped vapor-liquid contacting deck having an upper first side and a lower second side;
   (b) at least two trough-shaped downcomer means each formed by two opposing sidewalls and two opposing end walls which are shorter than the side walls, with the sidewalls and end walls oriented perpendicular to the plane of the tray, each downcomer means having a substantially open inlet located on the first side of the contacting deck and a liquid sealable outlet means located on the second side of the contacting deck, the outlet means comprising sets of spaced apart openings in a seal plate attached to end walls and side walls;
   (c) a plurality of antipenetration pans associated with each individual downcomer means and aligned with said openings of the outlet means in the downcomer means such that liquid descending from said openings will impinge upon an antipenetration pan, with each antipenetration pan comprising a perforated plate substantially parallel to said contacting deck and two raised lips projecting from the perforated plate toward the downcomer means and located on the two opposing sides of the antipenetration pan which are parallel to the end walls of the downcomer means.

2. A fractional distillation column comprising a plurality of vapor-liquid contacting trays as characterized in claim 1 enclosed within a cylindrical outer vessel, with the downcomer means of vertically adjacent contacting trays being perpendicular.

3. A multiple downcomer fractional distillation tray comprising:
   (a) a perforated tray deck having a planar upper first surface and a lower second surface;
   (b) a plurality of downcomer means spaced in parallel arrangement across the tray deck, each downcomer means having an inlet located on the first side of the tray deck and a plurality of liquid-sealable outlets located on the second side of the tray deck;
   (c) a plurality of antipenetration devices aligned with and located a discreet distance away from each liquid-sealable outlet of said downcomer means and locate don the second side of the tray deck, the antipenetration devices comprising a perforated substantially planar surface parallel to the tray deck with the planar surface of the antipenetration devices being terminated on at least two opposing sides by raised lips projecting toward said tray deck, said lips being perpendicular to said downcomer means.

4. A multiple downcomer fractional distillation tray comprising:

(a) a perforated tray deck having a upper first side and a lower second side;

(b) a plurality of rectangular downcomer means spaced in parallel arrangement across the tray deck, each downcomer means having an open first end located on the first side of the tray deck and a closed second end containing a plurality of liquid-sealable outlets and located on the second side of the tray deck, with the liquid-sealable outlets being spaced along the second end of the downcomer in groupings which provide alternating imperforate and perforate zones;

(c) at least one antipenetration device aligned with and located a discrete distance away from each grouping of the liquid-sealable outlets of said downcomer means and located on the second side of the tray deck, the antipenetration devices being in spaced arrangement along the downcomer means and with each antipenetration device comprising a perforated substantially planar surface parallel to the tray deck and having two imperforate side panels extending from opposing ends of sid planar surface toward the liquid-sealable outlets of said downcomer means.

* * * * *